(12) United States Patent
Jameson (10) Patent No.: US 7,711,014 B2
(45) Date of Patent: May 4, 2010

(54) APPARATUS AND METHOD FOR GENERATING SHORT OPTICAL PULSES

(75) Inventor: Ralph Stephen Jameson, Orefield, PA (US)

(73) Assignee: Clear Align LLC, Eagleville, PA (US)

( * ) Notice: Subject to any disclaimer, the term of this patent is extended or adjusted under 35 U.S.C. 154(b) by 362 days.

(21) Appl. No.: 11/546,236

(22) Filed: Oct. 11, 2006

(65) Prior Publication Data

US 2007/0091940 A1 Apr. 26, 2007

Related U.S. Application Data

(60) Provisional application No. 60/724,880, filed on Oct. 11, 2005.

(51) Int. Cl.
*H01S 3/10* (2006.01)

(52) U.S. Cl. .............................. 372/9; 372/20

(58) Field of Classification Search ............... 372/6, 372/18, 29.011, 30, 9
See application file for complete search history.

(56) References Cited

U.S. PATENT DOCUMENTS

| 5,530,709 | A | | 6/1996 | Waarts et al. |
|---|---|---|---|---|
| 5,627,848 | A | | 5/1997 | Fermann et al. |
| 5,657,339 | A | * | 8/1997 | Fukunaga ............ 372/50.11 |
| 5,708,669 | A | | 1/1998 | DiGiovanni et al. |
| 5,856,991 | A | * | 1/1999 | Ershov .................. 372/57 |
| 5,867,305 | A | | 2/1999 | Waarts et al. |
| 5,898,715 | A | | 4/1999 | LeGrange et al. |
| 5,933,271 | A | | 8/1999 | Waarts et al. |
| 5,949,941 | A | | 9/1999 | DiGiovanni |
| 6,081,369 | A | | 6/2000 | Waarts et al. |
| 6,151,338 | A | | 11/2000 | Grubb et al. |
| 6,157,763 | A | | 12/2000 | Grubb et al. |
| 6,212,310 | B1 | | 4/2001 | Waarts et al. |
| 6,275,632 | B1 | | 8/2001 | Waarts et al. |
| 6,298,187 | B1 | | 10/2001 | Waarts et al. |
| 6,345,141 | B1 | | 2/2002 | Grubb et al. |
| 6,347,007 | B1 | | 2/2002 | Grubb et al. |
| 6,442,182 | B1 | * | 8/2002 | Govorkov et al. ...... 372/29.021 |

(Continued)

OTHER PUBLICATIONS

L-3 Advanced Laser Systems Technology, Inc., ELRF-1, Eyesafe Laser Rangefinder, Jun. 2006, Website page at http:www.1-3com.com/alst/products_elrf1.htm.

(Continued)

*Primary Examiner*—Minsun Harvey
*Assistant Examiner*—Tuan N. Nguyen
(74) *Attorney, Agent, or Firm*—Kenneth J. Lukacher (57) ABSTRACT

An apparatus for generating short optical pulses is provided having a storage medium capable of storing optical energy, a first module for delivering pumping optical pulses or continuous beam into the storage medium to energize the storage medium, and a second module for delivering one or more trigger optical pulses to the optical storage medium. Each of the trigger optical pulses has a rising edge which causes a cascade release of the energy stored in the storage medium in an output optical pulse having a greater power and narrower in width or duration (at full width at half maximum) than the trigger optical pulse that caused the output pulse. A control module in the apparatus controls the operation of the pump module and trigger module so as to provide the desired characteristics of output optical pulses from the apparatus.

34 Claims, 7 Drawing Sheets

U.S. PATENT DOCUMENTS

| | | | | |
|---|---|---|---|---|
| 6,618,403 | B2* | 9/2003 | Stamm et al. | 372/29.021 |
| 7,170,590 | B2* | 1/2007 | Kishida | 356/32 |
| 7,373,086 | B2* | 5/2008 | Yamamoto et al. | 398/146 |

OTHER PUBLICATIONS

RP Photonics, Feb. 2007 Encyclopedia of Laser Physics and Technology, Photonic bandgap fibers, Website page at: http://www.rp-photonics.com/photonic_bandgap_fibers.htm.

Bjarklev, Anders et al.,Photonic Crystal Fibres, Springer Science (New York), 2003.

Perry, Michael, The Amazing Power of the Petawatt, Lawrence Livermore National Laboratory,S&TR Mar. 2000.

Trussel, C, Ward et al., Diode-Pumped Er, Yb:glass Micro-Laser,LASE 2004 Presentation, Conference 5332 Solid State Lasers XIII: Technology and Devices, Presentation 5332-14, Nov. 2005.

J. Nettleton et al., "Monoblock Laser for Low-Cost, Eyesafe, Microlaser range finder", Applied Optics, vol. 39, No. 15, 2000.

K.P. Papathanassiou, and Shane R. Cloude, "Single-Baseline Polarimetric SAR Interferometry", IEEE Transactions On Geoscience and Remote Sensing, vol. 39, No. 11, Nov. 2001.

IPG Photonics, EAU-W Series, Erbium Amplifiers for C-band and L-band WDM Applications, Website found at: http://ipgphotonics.com/products_15_micron_lasers_pulsed_elp_series.html, 2002.

IPG Photonics, ELR Series, "Eye-Safe" High Power Mode Erbium Fiber Lasers, 2003.

Siegman, Anthony E., Lasers, University Science Books, (Sausilito, CA) 1986.

Bjarklev, Anders, Optical Fiber Amplifiers: Design and System Application, Artech House, (Boston & London), 1993.

\* cited by examiner

APPARATUS AND METHOD FOR GENERATING SHORT OPTICAL PULSES

This application claims priority to U.S. Provisional Application No. 60/724,880, filed Oct. 11, 2005, which is herein incorporated by reference.

FIELD OF THE INVENTION

This invention relates to an apparatus and method for generating short optical pulses, and in particular to an apparatus and method for generating short optical pulses using an optical storage medium which is pumped with energy that is efficiently released by the rising edge of trigger pulses as high power short optical pulses, rather than to amplification of entire trigger pulses. The optical pulse may be on the order of sub-microsecond down to sub-nanosecond in temporal width. The invention is useful as an optical pulse source in systems and devices for LIDAR, remote sensing, laser altimeters, laser range finding, and medical procedures.

BACKGROUND OF THE INVENTION

Short pulse, high power lasers are used in various applications, since these lasers have power advantage of a pulsed laser over a continuous output laser is that the energy output can be compressed into a very short time period, resulting in very high energy per unit time. Two traditional ways of achieving short optical pulses with high optical power are cavity Q-switching and cavity mode locking. In the Q-Switch method the Q-factor or figure of merit for a cavity is initially set very low such that energy transferred into the cavity does not induce appreciable stimulated emission. The energy within the cavity is allowed to build up until the Q-factor of the cavity is switched rapidly to a very high state such that significant feedback is present, significant stimulated emission is generated, and the cavity lases, thereby generating an intense, short optical pulse that discharges a substantial portion of the energy the cavity had stored during the low-Q state. The Q-switch technique allows substantially more energy to be stored and released by the resonant cavity than if the resonant properties of the laser cavity were not reduced by the Q-switch. The Q-switch may be accomplished by the use of non-linear crystals, saturable absorbers, and oscillating or rotating mirrors. Q-switched lasers are described, for example, in LASE 2004 Conference Proceedings 5332, and in J. Nettleton, et. al. "Monoblock laser for a low-cost, eye-safe, microlaser range finder"; Applied Optics, Vol. 39, No. 15, 20 May 2000, pp. 2428-2432. Cavity mode locking also utilizes a laser, but instead of a Q-switch, the longitudinal modes of the laser are locked to a set spectral spacing such that the superposition of the broad spectrum of individual spectral peaks superimposes to create an optical signal that is narrow in the time domain. Cavity mode locking is described, for example, in Siegman, LASERS, University Science Books, January 1986, ISBN 0935702113.

Although providing very short optical pulses, lasers operating by Q-switching and cavity mode locking are expensive, large and bulky, and are often custom built for optical applications. Thus, other ways have been developed for achieving short high power optical pulses using a cladding pumped fiber. Cladding pumped fiber lasers use a specially prepared glass fiber having a core on the order of 5 micrometers diameter doped with rare earth ions, such as Erbium (Er), Neodymium (Nd), or Ytterbium (Yb). The surrounding glass cladding which supports the doped core is irradiated longitudinally (along the fiber axis) by high power pumping lasers whose wavelength is selected to be absorbed by the rare earth dopants, and whose combined power may be many kilowatts. The cladding is much larger in cross section than the core, so that much more optical power can be injected than could be injected directly into the core. As the high power pumping laser beams cross the core of the glass fiber they are not captured to form a guided wave, but nonetheless are partially absorbed to energize the rare earth ions. The cladding is intentionally fabricated so that it is not round, and the pumped laser light undergoes mode-mixing in the glass fiber to avoid depleting the modes that intersect the core. Using this method, IPG Photonics of Oxford, Mass., USA, produces lasers that exceed 10 kilowatts continuous output in a beam diameter of 100 micrometers. See also for example, U.S. Pat. No. 5,949,941, issued to D. J. DiGiovanni, titled "Cladding-pumped fiber structures".

A different class of actively pumped fiber often used in optical communication systems injects the pumping laser beam directly as a single mode beam into the doped core of the glass fiber. This often limits the amount of pump power that can be injected to many hundreds of milliwatts. Such a device is often referred to as an optical fiber amplifier, since it is typically used to amplify optical signals of the proper wavelength as they pass through the core of the fiber. These amplifiers are generally operated in the linear regime, where the input signal is small enough that the gain is independent of the signal. In this linear region, the output signal is an amplified exact replica of the input signal in terms of wavelength, polarization state, power vs. time. For example, such optical amplifiers are described in Waarts et al., U.S. Pat. Nos. 6,081, 369, 5,933,271, and 5,867,305. The goal of such optical amplifiers is to produce an output optical signal that is an amplified version of an input optical signal, and as such it is important to maintain fidelity of the temporal shape of the output signal with respect to the input signal. For the case of a series of input optical pulses, these optical amplifiers provide output optical pulses having the same wavelength, pulse width, and spacing between pulses as the input optical pulses, but at an increased optical power level. Although useful in optical communication systems to linearly amplify communication signals, the release of stored energy from the optical fiber must be over the entire input signal to linearly amplify such signals, which limits applications of such amplifiers.

Although optically pumped fiber are useful to transfer energy coherently into optical signals, i.e. to optically amplify the optical signals, they have not heretofore been used with trigger pulses as described by the present invention which causes a cascade energy release of stored energy in the form of high power optical pulses that more efficiently utilize the stored energy, rather than to amplification of the entire optical pulse that triggered such release. Thus, it would be desirable to produce short high power optical pulses without the complexity and expense of Q-switching and cavity mode locking based devices, which are initiated by such optical trigger pulses applied to a pumped energy storage medium, where each trigger pulse produces a cascade energy release as an output optical pulse that is not an amplified replica of the trigger pulse or any other input optical signal.

SUMMARY OF THE INVENTION

Accordingly, it is an object of the present invention to provide an apparatus and method for generating short high power optical pulses by applying one or more optical trigger pulses to an energy pumped storage medium such that the medium outputs short duration optical pulses by a cascade energy release of stored energy from the storage medium.

It is another object of the present invention to provide an apparatus and method for generating short high power optical pulses using trigger pulses applied to a pumped optical storage medium in which the optical pulses output from the storage medium have applications in LIDAR, laser range finding, laser altimeter, remote sensing, and medical uses.

Briefly described, the present invention embodies an apparatus having a storage medium capable of storing optical energy, a pump module for delivering a series of pumping optical pulses or continuous beam into an optical storage medium to energize the storage medium, a trigger module for delivering one or more trigger optical pulses in which each trigger pulse triggers a cascade release of the energy stored in the storage medium in an output optical pulse having greater power and being narrower in width or duration (full width half maximum) than the trigger optical pulse that caused the output optical pulse. A control module in the apparatus controls the operation of the pump module and trigger module so as to provide the desired characteristics of output optical pulses, such as power, repetition rate, and pulse width or duration by timing of pumping and trigger pulses, and wavelength(s) when the trigger module contains one or more light sources of different or tunable wavelength(s).

The trigger optical pulses each have a rising edge which triggers the release of each of the output pulses from the storage medium by causing a cascade release of energy stored in the optical storage medium in a stimulated discharge of substantially all of the energy stored by a storage medium. This rapid discharge or dump of the energy in response to the trigger pulse is as an avalanche effect, and thus the apparatus provided by the present invention is called an avalanche pulsed laser (APL). The APL can generate optical pulses on the order of microseconds to sub-nanoseconds, but preferably is less than one microsecond, or less than 10 nanoseconds depending on application of the output pulses. The trigger module consists of one or a plurality of trigger sources. Preferentially, laser trigger sources are utilized to generate a trigger pulse or series of trigger pulses that rapidly release the energy stored by the storage medium through stimulated emission. The power and shape of the trigger pulses are such that the initial portions of the trigger pulse creates an exponentially increasing cascading energy release and depletes the energy out of the APL such that the trailing portions of the trigger pulse are not significantly amplified. The result is a short output optical pulse that can have orders of magnitude more power than the initial trigger pulse as well as having the output pulse be significantly narrower than the initial trigger pulse. The trigger module may have different trigger sources or wavelength-tunable trigger sources to enable the APL to tune the output pulse wavelength or to emit alternating pulses of different wavelengths. Also, the shape of the trigger pulses, such as their rising edge, provided by one or more light sources of the trigger module may be controllable by the controller modules.

The pump module represents a single pump source or a plurality of pump sources for pumping energy into the storage medium. The trigger module represents a single or a plurality of optical trigger sources that deliver an optical trigger pulse or sequence of optical trigger pulses into the storage medium.

Any device that is capable of storing the energy received from the pumping module and releasing the energy in the form of an optical beam when incited to by the trigger module may represent the storage medium. Examples of the storage medium include laser gas mixtures, such as HeNe, HeCd, ArF, semiconductors, such as GaAs, AlGaAs, and GaInAsP, or glass and crystals, such as Nd:YAG and Erbium-doped silica fiber, or photonic bandgap fiber. The storage medium is selected based upon parameters such as the desired emission wavelength, energy storage efficiency of the storage medium, and the ability of the storage medium to efficiently and rapidly emit its stored energy in an optical form.

One feature of the present invention is that the output pulse of the APL is significantly shortened in time in relation to the trigger optical pulses. This represents optical energy discharge different from optical gain, the property optimized in optical amplifiers. The input trigger pulse is not optically amplified, only a portion—this being the leading edge of the trigger pulse—gains significant energy from the energy storage medium. The leading edge rapidly builds to an intensity which has extracted sufficient energy that the leading edges suppresses the gain for the remainder of the pulse. Thus, the output is not only shorter in time, but is significantly different in temporal shape than the input trigger signal. In the case where the storage medium represents an optical fiber, only the leading edge of the trigger pulse amplifies exponentially in the early part of the doped fiber, leaving the gain increasingly depleted as the pulse propagates, so that the trailing edge of the pulse receives less gain. In the final section of the optical fiber in which the pulse fully depletes the stored energy, the trailing edge of the pulse receives no amplification at all. Due to the depletion of substantially all of the storage medium's dischargeable energy, any variations of the trigger signal are lost as the energy is extracted, so that no trigger signal variations are present in the output pulse. In this manner, the trailing edge of the trigger pulse is not significantly amplified since it sees a substantially depleted storage medium and the result is that the output pulse is narrower and contains significantly larger power than the initial trigger pulse.

In the case that the storage medium of the APL is an optical fiber, the optical fiber acts as an efficient light guide for the optical trigger pulse and may be utilized to guide optical radiation coming from the pump module such that the optical fiber storage medium can be efficiently pumped. Specific examples of optical fiber capable of being used to generate optical pulses include Erbium-doped or a combination of Erbium and Ytterbium dopants in a silica fiber. These dopants allow for optical gain in the 1520-1650 nm wavelength band. For these specific examples, the pump module may be a flash lamp, but preferentially contains a single or a plurality of fiber-coupled lasers emitting at approximately 980 nm or 1480 nm. For this example, the trigger optical source can be a fiber-coupled laser or other fiber coupled source, such as an LED (Light Emitting Diode) emitting at a wavelength of approximately 1520-1650 nm. Since the APL works under the principle of stimulated emission, the output wavelength of the APL is the same wavelength as the trigger optical source.

In the case of the storage medium of the APL is a crystal or glass, the crystal or glass has an appropriate composition to provide optical signal amplification at the desired wavelength. An exemplary material is Neodymium doped YAG (Yttrium Aluminum Garnet), which provides optical gain at a signal wavelength of 1060 nm. An alternative material is a phosphate glass doped with Erbium and Ytterbium, providing gain in the wavelength range of roughly 1520-1650 nanometers. This material can be used in bulk form with the light from the trigger sources coupled into it through the use of bulk optics or the material can be in wafer form, where the material is patterned into waveguides onto wafer or wafers.

The trigger module may emit a pulse of a single spectral wavelength or a spread of spectral wavelengths. When emitting a trigger pulse of a spread of spectral wavelengths, the resulting pulse out of the storage medium has the same spectral spread of wavelengths as that of the trigger module. Since light of different wavelengths will propagate at slightly different velocities through a storage medium due to index of refraction dispersion, an optical element of a dispersive material or dispersive compensating material may be added to the output of the storage medium in order to broaden or shorten, respectively, the output optical pulse. Such dispersive material or dispersive compensating material may for example be free-space gratings, fiber gratings, or fiber spools, or any combination thereof.

In case where the storage medium in an optical fiber, or a medium of a small size such that the optical intensity of the transmitted optical signal may cause optical damage to the surface of the storage medium, an optional transparent optical element of a bulk optical material may be attached to the output of the optical fiber. The purpose of such transparent optical material is to prevent optical damage that may potentially occur at the exit face of the optical fiber when the optical pulse initiated by the trigger module and generated within the storage medium exits the fiber. By attaching a bulk transparent material to the optical fiber end face, the optical pulse first exiting the fiber face will expand substantially due to diffraction before exiting the air-bulk transparent material interface. The result being that the optical power density of the optical pulse exiting the transparent bulk material is reduced versus that of the optical fiber if no transparent optical material is attached. To reduce back reflections that may create optical damage, the transparent optical material is preferentially index matched to the optical fiber.

The APL may emit optical pulses at arbitrary wavelengths through the proper selection of pump sources, trigger sources, and storage medium. For the 1.55 μm wavelength regime, the storage medium is preferentially erbium-doped optical fiber, the pump sources are a combination of 980 nm and 1480 nm lasers, and the trigger sources are high-speed semiconductor lasers emitting in the telecommunication C and L-band (i.e., 1520-1650 nm). This 1550 nm wavelength regime is advantageous for remote sensing, LIDAR, laser range finding, and laser altimetry applications due to it being considered eye-safe. This wavelength regime is also advantageous for the medical community for cosmetic skin surgeries.

Also, the APL by use of polarized trigger pulses may output optical pulses of polarized light, thereby enabling remote sensing applications that employ heterodyne and homodyne detection techniques. Also, an optional polarization control element may be provided to change the polarization of the output pulses, such as TE or TM, or linear or circular polarization. Such polarization control element may be static or dynamic. Where a dynamic polarization control element is used, the control module may control the polarization state of such element. An interferometric detection module may be provided within or external of the housing of the APL to enable heterodyne or homodyne detection of a reflected output pulse from the APL.

A typical characteristic of optical energy storage meda is spontaneous decay emission which is the process by which an energized atom decays from its energized state to a lower energy state, releasing a photon within the useful signal range. Such a photon is not differentiated by the medium from a desirable trigger photon. Spontaneous decay photons may be amplified within the gain medium, producing Amplified Spontaneous Emission (ASE), which is a parasitic loss of energy from the energy storage medium (e.g., is not available to contribute to a desired output signal). If needed in order to suppress ASE in the APL, an optical isolator may be provided in the optical path of the generated pulse to prevent backward traveling light. An alternate method to suppress ASE, is to place optical filter(s) in the path of the generated pulse; such optical filters transmitting the wavelength(s) of the trigger pulses, but substantially attenuate wavelength(s) which depart from the trigger pulses. The optical filters prevent the build up of out-of-band ASE in both the forward direction and the reverse direction. In the case of a photonic bandgap fiber as the energy storage medium in an APL, such a fiber is built to allow only a narrow transmission around the desired trigger laser wavelength and acts as an optical filter along the entire length of the fiber. This will similarly suppress the growth of ASE in the APL, and thereby reduce the parasitic loss to ASE. The prevention of the buildup of ASE in both the forward and the backward direction allows a greater amount of energy to be stored in the optical storage medium.

BRIEF DESCRIPTION OF THE DRAWINGS

The foregoing objects, features and advantages of the invention will become more apparent from a reading of the following description in connection with the accompanying drawings, in which.

DETAILED DESCRIPTION OF THE INVENTION

Figure 1:
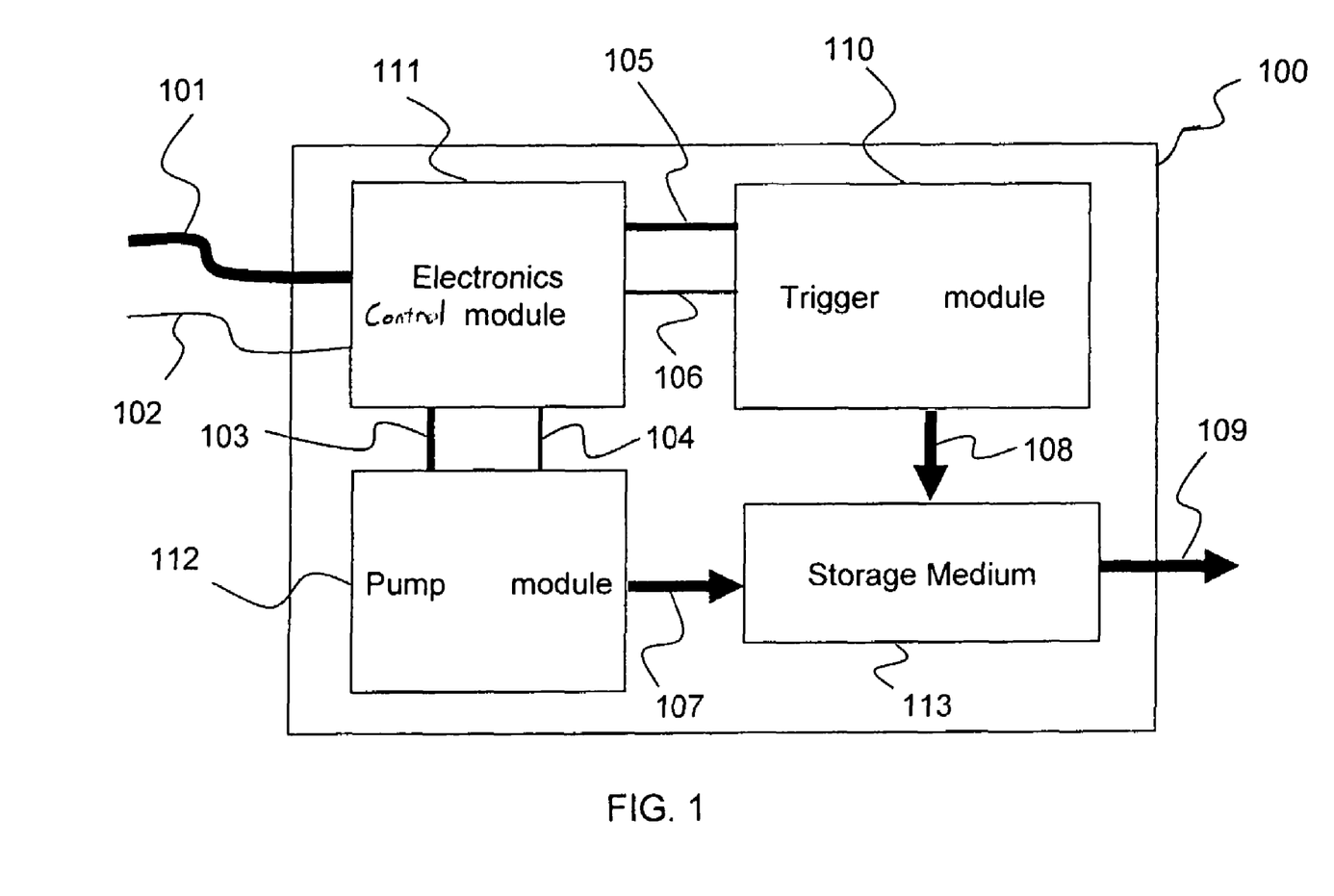
FIG. 1 is a block diagram of the apparatus of the present invention termed an avalanche pulsed laser (APL)

Referring to FIG. 1, a block diagram of the apparatus of the present invention, termed an avalanche pulsed laser (APL) 100, is illustrated. APL 100 has a control module 111, a trigger module 110, a pump module 112, and a storage medium 113. The pump module 112 delivers energy to the storage medium 113 which stores said energy, and trigger module 110 delivers trigger pulses to the storage medium to cause a cascade release of such stored energy in output optical pulses 109, as described below. The control module 111 contain electronics for controlling the operation of the trigger module 110 and pump module 112 in response to external control signals received via a control cord or cable 102 to change specific APL output pulse 109 characteristics, such as pulse power, pulse repetition rate, pulse wavelength, and pulse length. Power to the APL 100 is supplied via a power cord 101 to control module 111. Optionally, the APL 100 may have an internal power source that by way of example may be a battery or a solar cell combined with a rechargeable battery.

Power lines 103 and 105 and signal (or control) lines 106 and 104 respectively connect the control module 111 to the trigger module 110 and pump module 112. The signal lines 104 and 106 control the timing of the trigger module 110 and the pump module 112, respectively, which is used to change output pulse 109 characteristics. The pump module 112 supplies energy to the storage medium 113 via a pump connection (or path) 107 and such energy being supplied in an intermittent or a continuous manner may be in one or more forms including, but not limited to, visible light, infrared radiation, ultraviolet radiation, electricity, or heat. Pump connection 107 may have one or more optical elements for communication of optical beam(s) to the storage medium 113, such as fiber optics, beam shaping lens(es), or other optical components, which may depend on the particular type of storage medium 113. The pump module 112 may contain a single or a plurality of pump sources that may include but are not limited to flash lamps, lasers, LEDs, heat sources (e.g., heated filaments), light emitting electronic circuits, fluorescent lamps, and inductive heaters. By way of example, multiple pump sources may be desirable for the purposes of more rapidly storing energy into the storage medium 113 or for the purpose of pumping the storage medium 113 with more than one form of energy. As a clarifying example, the storage medium 113 may be more efficiently pumped if it is exposed to more than a single wavelength of light or if it is exposed to heat while simultaneously exposed to light. As a further clarifying example, the storage medium may be pumped by the application of an electric current, for example in creating excited gas ions in a Helium-Neon gas or in an Argon ion gas.

The storage medium 113 comprises any type of media capable of storing energy such that such stored energy can be dumped into an optical beam through the process called stimulated emission. As such, the storage medium 113 may be a media that includes but is not limited to gases, semiconductors, glasses, or crystals. For storage medium that include gases, examples include laser gas mixtures, such as HeNe (for APL emission wavelengths including 0.5435, 0.5941, 0.6119, 1.12, and 3.92 µm), HeCd (for APL emission wavelengths 0.442 and 0.351 µm), and ArF (for APL emission wavelength of 0.192 µm). For storage medium 113 that contain semiconductors, examples include GaAs (for APL emission wavelength of 0.84 µm), AlGaAs (for APL emission wavelength of 0.76 µm) and GaInAsP (for APL emission wavelength of 1.30 µm). For storage medium that include glass and crystals, clarifying examples include Nd:YAG (for APL emission wavelength of 1.06 µm) and Erbium-doped silica fiber (wavelengths of APL emission that range from 1.52 to 1.65 µm), a photonic bandgap fiber. Such an optical fiber of glass material may be silica glass, phosphate glass, fluoride glass, or chalcogenide glass, in which optionally at least a portion of such glass material has a concentration of one of or more of Erbium, Ytterbium, Neodymium, or Praseodymium that forms a continuous filament or channel between ends of the optical fiber. For storage media that include liquids and organic molecules, clarifying examples include Rhodamine 6G dye molecules dissolved in ethanol.

The particular storage medium 113 is chosen based upon parameters such as the desired emission wavelength, energy storage efficiency of the storage medium, and the ability of the storage medium to efficiently and rapidly emit its stored energy in an optical form.

In the case of the storage medium 113 of the APL 100 is a photonic bandgap fiber, such a fiber has photonic bandgap structures or crystals that resemble an optical filter, in that there are wavelengths that will be transmitted and wavelengths that will be blocked, but they can be made substantially isotropic. Photonic bandgap fiber are described for example, in Bjarklev et al., Photonic Crystal Fibres, published by Springer (2003), ISBN 1-4020-7610-X, and also in The Encyclopedia of Laser Physics and Technology, "Photonic Bandgap Fiber", http://www.rp-photonics.com/photonic$_{13}$ bandgap$_{13}$ fibers.html. Since a photonic bandgap fiber is built to allow only a narrow transmission around the desired trigger laser wavelength(s), it also may suppress the growth of ASE in the APL, and will reduce the parasitic loss to the ASE process, thereby preserving more available energy for the output pulse of the APL.

The trigger module 110, via its trigger connection (or path) 108, transmits photons into the storage medium 113 in order to rapidly release the stored energy in the storage medium through stimulated emission. The power and shape of the trigger pulses (or signals) are such that the initial portions of the trigger pulse create a cascading energy release and deplete the energy out of the APL 100 such that the trailing portions of the trigger pulse are not significantly amplified. Trigger connection 108 may have one or more optical elements for communication of pulsed optical beam(s) to the storage medium 113, such as fiber optics, beam shaping lens(es), or other optical components, which may depend on the particular type of storage medium 113. The wavelength of light emitted by the trigger module 110 is therefore selected to be the wavelength of light desired (in the range of wavelengths of possible emission from storage medium 113) to be output by the APL module 100 in the output beam 109. The trigger module 110 may be composed of one or a plurality of trigger sources that emit light, such as, but not limited to, a flash lamps, LEDs, lasers, electronics that produce electrical arc discharges, or fluorescent lamp. However, for applications requiring an output beam 109 that is reasonably coherent, such as LIDAR and medical ablation applications, LEDs and lasers are preferential for the trigger sources contained within the trigger module.

Modules 110-112 and storage medium 113 may be provided in a housing of the APL 100 having a window or port through which output optical pulses 109 are emitted. Such housing may have boards for supporting the electronics of module 110 and sources for modules 110 and 112, and connectors or lines for power and control signals 103-106, and optical connections 107-108. Such APL 100 may be a subassembly in a system for providing a source of high power short optical pulses in applications, such as LIDAR, remote sensing, laser altimeters, laser range finding, medical procedures, or other optical applications.

Figure 2:
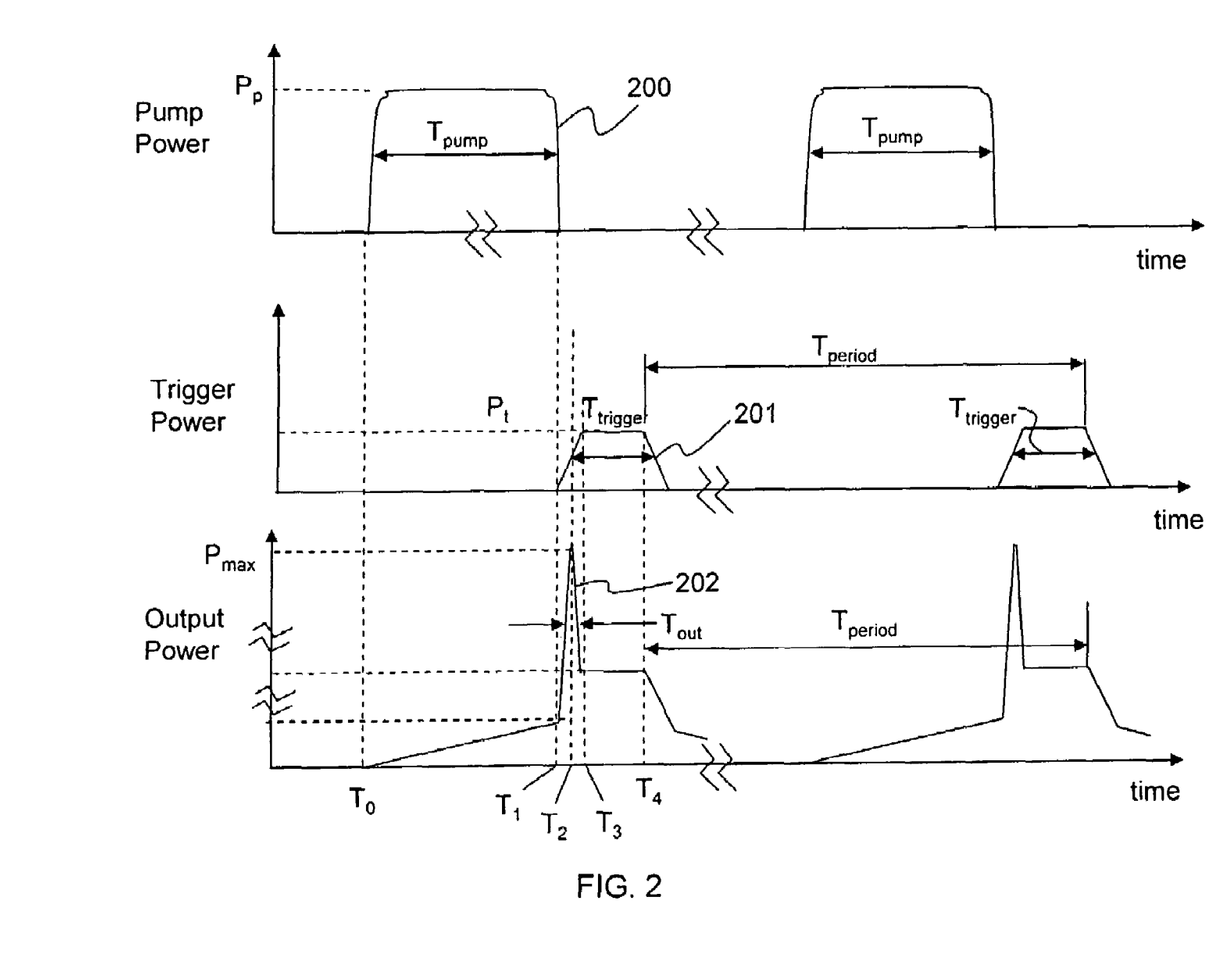
FIG. 2 is a timing diagram illustrating the timing and power of the pump pulses and the trigger pulses to generate output pulses from the APL.

In FIG. 2 an illustrative example of a timing diagram for the APL modules and APL output power is presented. As diagrammed in FIG. 2 and in reference to the schematic of FIG. 1, to generate a train of optical output pulses 109 from the APL of period $T_{period}$ (and therefore a repetition rate of $1/T_{period}$) the control module 111 directs the pump module 112 to begin pumping energy at discrete intervals $T_{period}$ for a temporal duration of $T_{pump}$, such that a series of pump pulses 200 is generated. For example, at a time $T_0$ energy begins flowing from the pump module 112 into the storage medium 113 via the pump connection 107. At time $T_0$ the output power of the storage medium begins to climb slowly due to the finite leakage of light as no storage medium is 100% efficient at storing energy. For a storage medium 113 described earlier that is a laser media, this leakage of energy is generally from spontaneous emission due to atoms decaying from an excited or inverted population state down to a ground state as will described in more detail in connection with FIG. 4. The plotted power of the pump pulse 200 may represent power in the form of conductive heat, radiative energy, light, electricity, or any combination thereof that is being directed into the storage medium 113. At a time $T_1$ (equal to $T_0+T_{pump}$) the pump module 112 stops sending energy into the storage medium, and the trigger module 110 is turned on such that a trigger pulse 201 of optical energy is generated with a FWHM equal to $T_{trigger}$. In practice, the trigger module 110 may be turned on before the pump module 112 is turned off. Alternately the trigger module 110 need not be turned on immediately after the pump module 112 is turned off, but if the delay between the two said events is minimized, the APL will be more efficient due to the non-zero energy leakage rate that exists for any practical storage medium. Due to the photons contained within the leading edge of the trigger pulse 201 that begins flowing through the storage medium 113 via the trigger connection 108, the storage medium 113 begins to dump its stored energy through stimulated emission. As the initial photons of the trigger source generate new photons via stimulated emission within the storage medium 113 these new photons propagate further into the storage medium and generate additional coherent photons via stimulated emission. The result, not dissimilar to an avalanche, is a wall of photons that travel through the storage medium 113, constantly amplifying until the maximum amount of power per unit length of the storage medium is dumped. Due to the avalanche effect being generated by the leading edge of the trigger pulse, the output power of the APL 100 does not necessarily peak at the peak power of the trigger pulse. As illustrated in FIG. 2, the peak of the output power pulse 202 of FIG. 2 (109 in FIG. 1) occurs at a time $T_2$, while the peak power of the trigger pulse may occur at later time $T_3$. Also, the peak output pulse $P_{max}$ can be significantly larger than the peak power $P_t$ of the trigger pulse. In fact, depending upon the storage capacity of the storage medium 113, the ratio $P_{max}/P_t$ can exceed several orders of magnitude. Due to the avalanche effect draining the stored power of the storage medium 113, only the leading edge of the trigger pulse of width $T_{trigger}$ gets amplified. The remainder of the trigger pulse passes through the storage medium 113 with little or no amplification. The aforementioned avalanche effect results in an output pulse 202 (109 in FIG. 1) having a FWHM $T_{out}$ that is significantly narrower than the trigger pulse 201 used to generate the output pulse 202. In this manner, for example, a nanosecond wide output pulse can be generated with a microsecond trigger pulse and as such the present invention differs dramatically from an optical amplifier that otherwise would exhibit a FWHM of an output pulse being substantial similar to that of an input pulse.

As described earlier, the control module 111 controls the repetition rate of the output beam pulses 109 by controlling the repetition rate of the pulses generated by the pump module 112 and trigger module 110. Although the pump module 112 signal in FIG. 2 is illustrated as a periodic event, for cases in which the pump sources of module 112 require an unacceptable time to power up and power down or for cases in which the repetition rate of the desired output pulses 109 are high enough that as soon as the trigger pulse fires the pump pulse must be turned on again, in such scenarios, the pump module 112 may be designed such that it supplies energy to the storage medium 113 in a continuous beam. In such situations, it is the electronics of the control module 111 that controls the timing of the trigger module's pulses that dictates the timing of the APL's output pulses 109. For control of the output energy and power of the APL's output pulses 109, the control module 111 regulates the amount of energy pumped into the storage medium by pump module 112 before the trigger pulses are fired by the trigger module 110 into the storage medium 113. The control module 111 may also change the shape of the trigger pulse so that the energy contained within the storage medium 113 is more or less rapidly discharged. For example, trigger module 110 may have one or more semiconductor lasers, in which the level of drive current applied thereto (in response to control signals 106) can adjust pulse shape, such as the rising edge of trigger pulses. For example, for an APL 100 operation in the C or L communication band (i.e., approximately 1520 to 1650 nm wavelengths), trigger module 110 may have trigger sources that are semiconductor communication lasers. Trigger lasers can be directly controlled at rates of 2.5 GHz, such as the C-band or L-band lasers available commercially from CyOptics of Breinigsville, Pa., USA, or JDSU of Milpitas, Calif., USA. For faster modulation and shaping of the trigger laser pulse (e.g., 10 and 40 GHz), the trigger module 110 may have semiconductor lasers that are integrated with a high-speed optical modulator such as electro-absorptive modulators operating at 10 GHz (e.g., as available by CyOptics), or a laser with constant optical output may be modulated by a lithium niobate optical modulator, such as available from JDSU.

For certain applications, the APL output pulses 109 emitting in the general 1.55 μm portion of the spectrum are desirable, as this wavelength region represents a spectral window where moisture in the air does not absorb and the spectral band is considered to be eye-safe in comparison to shorter wavelengths such as the 1.06 μm wavelength of a YAG laser or the 0.532 μm wavelength of a doubled YAG laser. As such, wavelengths in the 1.55 μm portion of the spectrum have applications in remote sensing, LIDAR, laser range finding, and laser altimetry. Such spectral band also has applications in the medical industry for the treatment of skin pigmentation including port wine stains.

Figure 3:
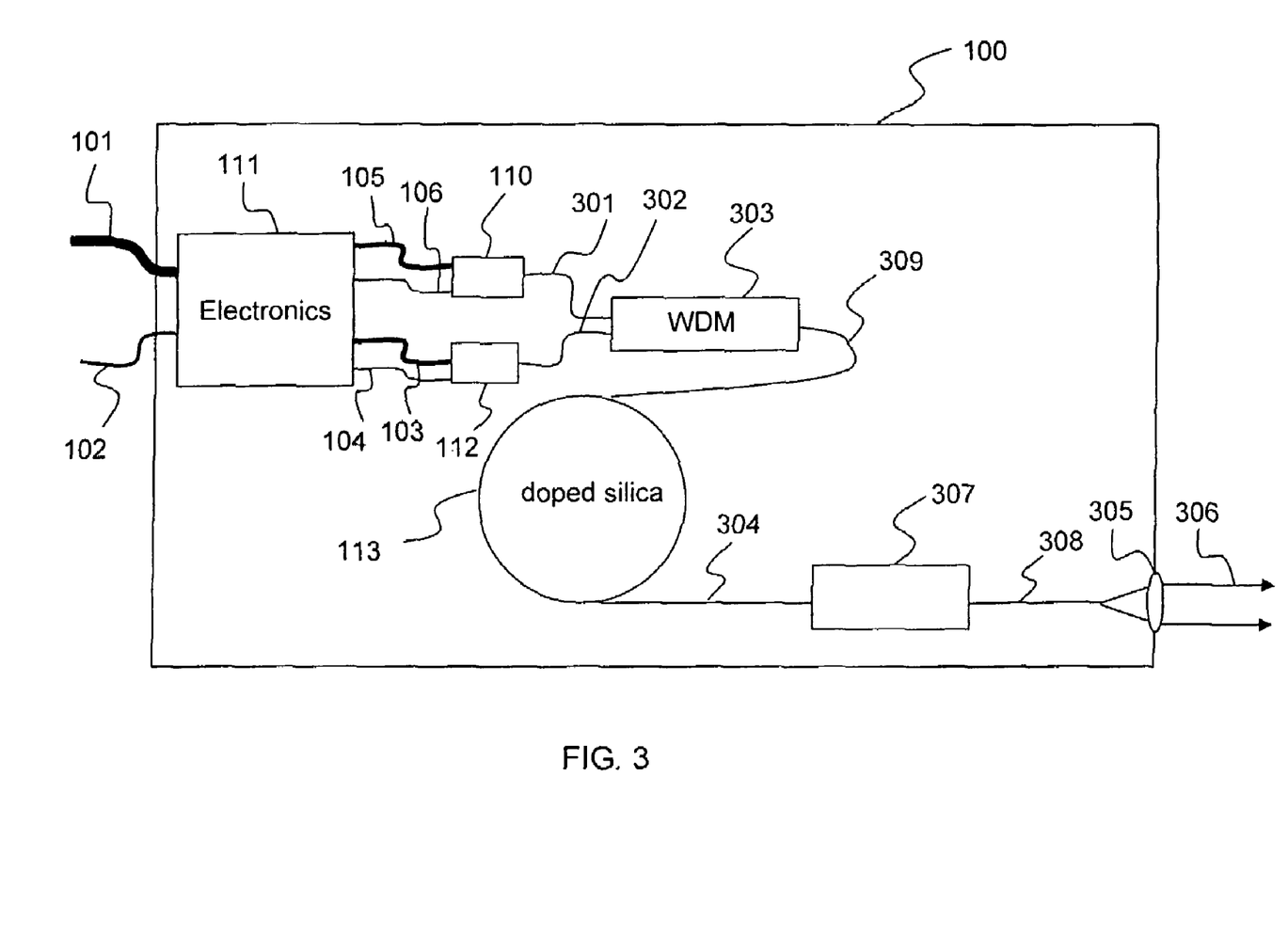
FIG. 3 is a schematic block diagram of one embodiment of the APL of FIG. 1 having a doped silica fiber as the storage medium.
Figure 4:
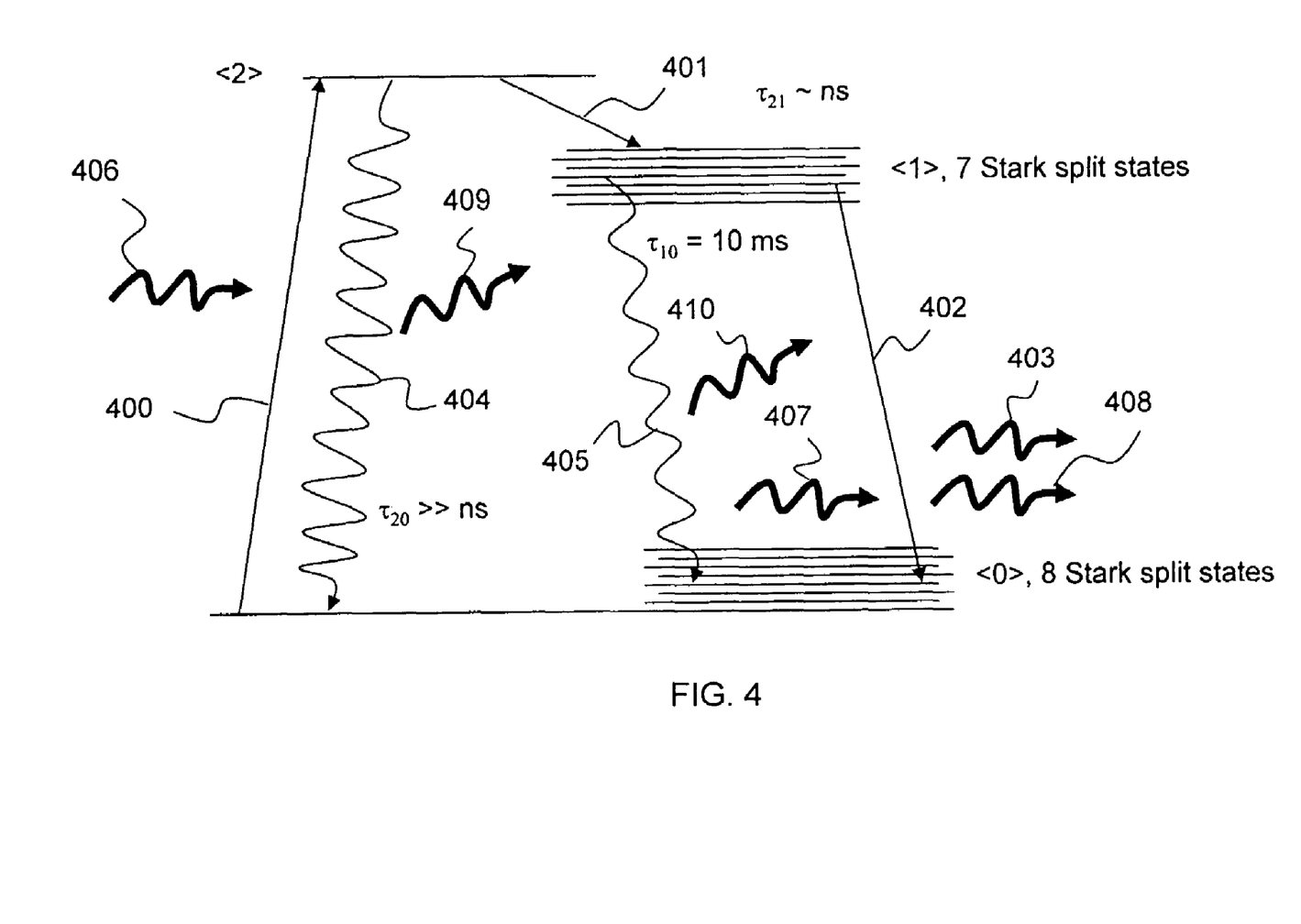
FIG. 4 is an energy level diagram of an Erbium-doped silica fiber of FIG. 3 to illustrate the operation of the APL.

Referring to FIG. 3, one embodiment of the APL 100 is illustrated for pulsed laser applications requiring wavelengths in the general 1.55 μm portion of the spectrum. In this embodiment, the storage medium 113 contains an optical fiber. Preferably, such fiber is Erbium-doped silica fiber which is commercially available from vendors such as Corning, Inc., of Corning, N.Y., USA, or OFS Fitel Lucent, of Somerset, N.J., USA. Erbium-doped silica can serve as an efficient storage medium and has been used in the fabrication of optical amplifiers in the prior art. As such, such erbium doped optical fiber can serve as one component of the APL 100. The energy levels of the fiber are depicted in FIG. 4. The energy diagram represented in FIG. 4 is a 3-level laser system wherein atoms at the ground state labeled <0> make a transition 400 to an excited upper state labeled <2> via a pump photon 406. For Erbium-doped silica, the ground state <0> is composed of 8 Start split states and the energy difference between levels <2> and <0> can be efficiently pumped with a pump module emitting photons with wavelengths of approximately 980 nm.

Due to the manifold of Stark split states comprising the levels <0> and <1>, and to the small energy difference between the Stark split sub-levels compared to the room temperature thermal energy of kT ~1/40 electron volt the populations of the sub-levels of the manifolds <0> and <1> are distributed according to the Boltzmann thermal distribution. As a result, in un-excited Er-doped glass, absorption is most favored between the lowest energy sub-level (most heavily populated) of the <0> state and the least populated (highest energy sub-level) of the <1> state.

Conversely, emission is favored between the lowest sub-level of <1> and the upper sub-level of <2>. This results is a significant difference in the absorption and emission spectrum of the Er-doped glass, allowing optical pumping directly from <0> to <1> at wavelengths in the range of 1480 nanometers.

Although atoms at the excited state <2> can spontaneously decay 404 back down to the ground state and reradiate an incoherent pump photon 409 of approximately the same wavelength as that emitted by the pump module, the time constant for said transition $\tau_{20}$ is significantly longer than a nanosecond. The more likely transition is the transition from the excited state <2> to an inverted state <1> as marked by the arrow 401. The transition process is nonradiative and results in almost all of the atoms pumped out of the ground state <0> to populate the inverted state <1>. Atoms remain in the inverted state <1> for a significant amount of time since the spontaneous decay transition from this state, labeled as 405, is on the order of $\tau_{10}$ ~10 ms. It is the spontaneous decay of atoms from the inverted state <1> to the ground state <0> producing incoherent photons 410 that produces a non-zero output power from the storage medium 113 that is represented in the output power graph of FIG. 2 during the time interval between $T_0$ and $T_1$. Therefore, to pump the maximum amount of energy into the storage medium 113 that contains Erbium-doped silica, a pump module 112 is provided such that the pump power $P_p$ entering the storage medium 113 is sufficiently high that the pump pulse 200 can have a length $T_{pump}$ that is shorter than the inverted states transition time of 10 ms, while still exciting all of the ground state <0> atoms into the inverted state <1>. Although a single fiber tap from the pump module 112 is shown being attached to the storage medium via the wavelength division multiplexer 303 and the fiber tap 309, multiple fiber taps from the pump module 112 to the storage medium 113 may be used in order to efficiently pump a fiber spool of significant length in under 10 ms. With atoms that are in the inverted state <1>, they can be brought down to the ground state <0> via stimulated emission. An incident photon 407 (such as from a trigger module 110) will stimulate an atom in the inverted state to drop down to the ground state <0> and in the process emit another photon 403 that is at the same wavelength and in phase with the incident photon 407. The incident photon 407 will continue propagating through the storage medium 113 as photon 408 and both photons 403 and 408, if encountering other atoms in the inverted state can generate additional photons through stimulated emission, thereby resulting in an amplification of the initial photon 407. For Erbium-doped fused silica, due to the Stark split levels of the inverted state <1> and the Stark split levels of the ground state <0>, the wavelength of the incident photons capable of producing stimulated emission can range in wavelengths from approximately 1520-1650 nm.

The Erbium-doped silica providing storage medium 113 in FIG. 3 may be substituted by a silica media doped with other species of rare earth ions, in order to operate at a different wavelength range of the optical signal. It may also be substituted by a fiber having additional doping ions, such as Ytterbium, which allow the use of a pump laser having a different wavelength than those listed above. Further, it may be substituted by an optical fiber in which the process of Stimulated Raman Emission gain is used to amplify the signal, allowing a very wide range of choice of signal wavelength by selection of appropriate pump laser wavelength. Other glass hosts, such as phosphate glasses, which have the advantage of accepting a much high doping concentration of Erbium ions, may also be used. The optical fiber may be configured as a cladding pumped fiber in which the pump laser is injected into the optical fiber in a region that forms the cladding for the area in which the optical signal travels. Other variants of optical fiber having different compositions, dopings, or pump methods may also be used in addition to those specifically described above.

Continuing to refer to FIG. 3, the pump module 112 for an APL 100 containing Erbium-doped silica as its storage medium 113, contains preferentially a single or a plurality of 980 nm lasers. Although other pump sources such as a flash lamp can be used, a flash lamp, though inexpensive, is used only for applications where the repetition rate of APL output pulses 306 is on the order of 1 Hz due to the recharge time required by the flash lamp. The pump module 112 is coupled via an optical fiber 301 to a wavelength division multiplexer (WDM) 303 that combines the radiation of the trigger module 110 that is also fiber coupled via an optical fiber 302 into a common third fiber 309 that may be fusion spliced to the input end face of a spool of Erbium-doped silica fiber of FIG. 3 providing storage medium 113. Such arrangement may be replicated using free-space optics for coupling the pump source and trigger source to the storage medium 113, though if the Erbium-doped silica of the storage medium is in the preferred form of an optical fiber, it may be advantageous to use fiber-pigtailed lasers for the pump sources and the trigger sources and to used a fused fiber WDM, such as is sold by Sifam Fibre Optics of Torquay, United Kingdom. The Erbium-doped silica fiber may be replaced with an Erbium-doped bulk silica material, so that no fibers are utilized.

The pump module 112 of FIG. 3 is capable of pumping the Erbium-doped silica fiber via the WDM 303 and the input fiber 309, and the trigger module 110 is capable of triggering the release of the energy via the WDM 303 and the input fiber 309.

For example, APL 100 of FIG. 3, using the parameters of the timing diagram of FIG. 2, may have $P_p$ and $P_t$ of 200 milliwatts and 1-2 milliwatts, respectively, with a $T_{pump}$ of 3 mS, a $T_{trigger}$ of range of 1 ns to 1 ms, produces $P_{max}$ of 100 kW watts having a duration of 0.5 to 1 ns (100 microJoules). The erbium fiber is capable of storing in this example 400 microJoules of optical energy. In this example, using fiber fusion splicing for assembling components, and supplying the necessary electrical drive current to the pump laser and the trigger laser, the APL 100 of FIG. 3 may have the following example of components to achieve such parameters: storage medium 113 may be an Erbium fiber, model MP-980 type, 30 meters, available from OFS-Fitel of Somerset, N.J., USA; pump module 112 may be a 980 nm pump laser, model 2600 series, ~200 mW, available by JDSU, of Milpitas, Calif., USA; the trigger module 110, a D572 type laser, 2 mW, wavelength 1530~1560 nm, available from CyOptics of Breinigsville, Pa., USA; and beam combiner 303 may be a 980 Fused Pump-Signal WDM, available from Sifam, Torquay, UK. One application of the APL 100 of such example is as a high power pulse light source for a laser range finder providing an output pulse rate of 300 Hz.

The trigger module 110 may contain one trigger source or a plurality of trigger sources. The trigger sources need not be all at the same wavelength nor have their respective trigger pulses synchronized. By way of example, the APL 100 may be programmed via control module 111 to emit via stimulated emission a specific wavelength within the band of wavelengths that the storage medium 113 is capable of outputting (e.g., approximately 1520-1650 nm the case of Erbium-doped silica). Therefore within the trigger module 110 a trigger source with the desired wavelength will be turned on to produce an APL output pulse of the same desired wavelength, while trigger sources of other emission wavelengths would be turned off. Additionally, the trigger module may contain trigger sources that are capable of emitting over a range of wavelengths, such as a tunable semiconductor laser, such as for example, made by Intel, of Santa Clara, Calif., USA; Bookham, of San Jose, Calif., USA; or JDSU, of Milpitas, Calif., USA. Such APL incorporating multi-wavelength trigger sources may also be programmed to emit alternating pulses of different wavelengths. In other words, alternating pulses of the trigger pulse diagrammed in FIG. 2 may be different wavelengths. Control signals 106 to the trigger 110 control the wavelength of multi-wavelength trigger sources and/or tunable trigger sources.

Optionally, a dispersion-controlling optical element 307 may be provided for receiving optical pulses outputted from storage medium 113, via an optical fiber 304 or other optical means, to change the temporal width (or shape) of such optical pulses. This may be useful if the trigger module 110 contains spectrally broadened optical sources, such as superluminescent LEDs, as such the outputted light pulses from the storage medium 113 will also be spectrally broadened. For example, the trigger pulses may have a substantially continuous optical spectrum with a spectral width of at least ten nanometers, or less than one nanometer. The dispersion controlling element 307 may for example be a spool of dispersive fiber if the desire is to broaden the pulse width, or a spool containing dispersion compensating fiber if the desire is the narrow the pulse width. The dispersion-controlling element 307 may also be a diffraction grating to perform pulse broadening or compression.

To control the cross-sectional shape of the output pulse 306 of the APL 100, optional beam-shaping optics 305 can be incorporated into the APL 100. By way of example, beam shaping optics 305 may be a simple fiber and fiber connector such that the APL can be coupled to other opto-electronic modules using standard FC or SC or other connectors. As a further example, beam-shaping optics 305 may consist of free-space lenses, mirrors, or other optical elements that shape the output beam into a beam of a specific diameter and reasonably collimated, such that it is capable of transmitting distances ranging from several meters to several kilometers, such as for the purposes of laser range-finding. As an additional example, beam-shaping optics 305 may be used to create focused beam or an array of focused beams for the purposes of laser machining or epidural treatment as part of a medical procedure.

Figure 5:
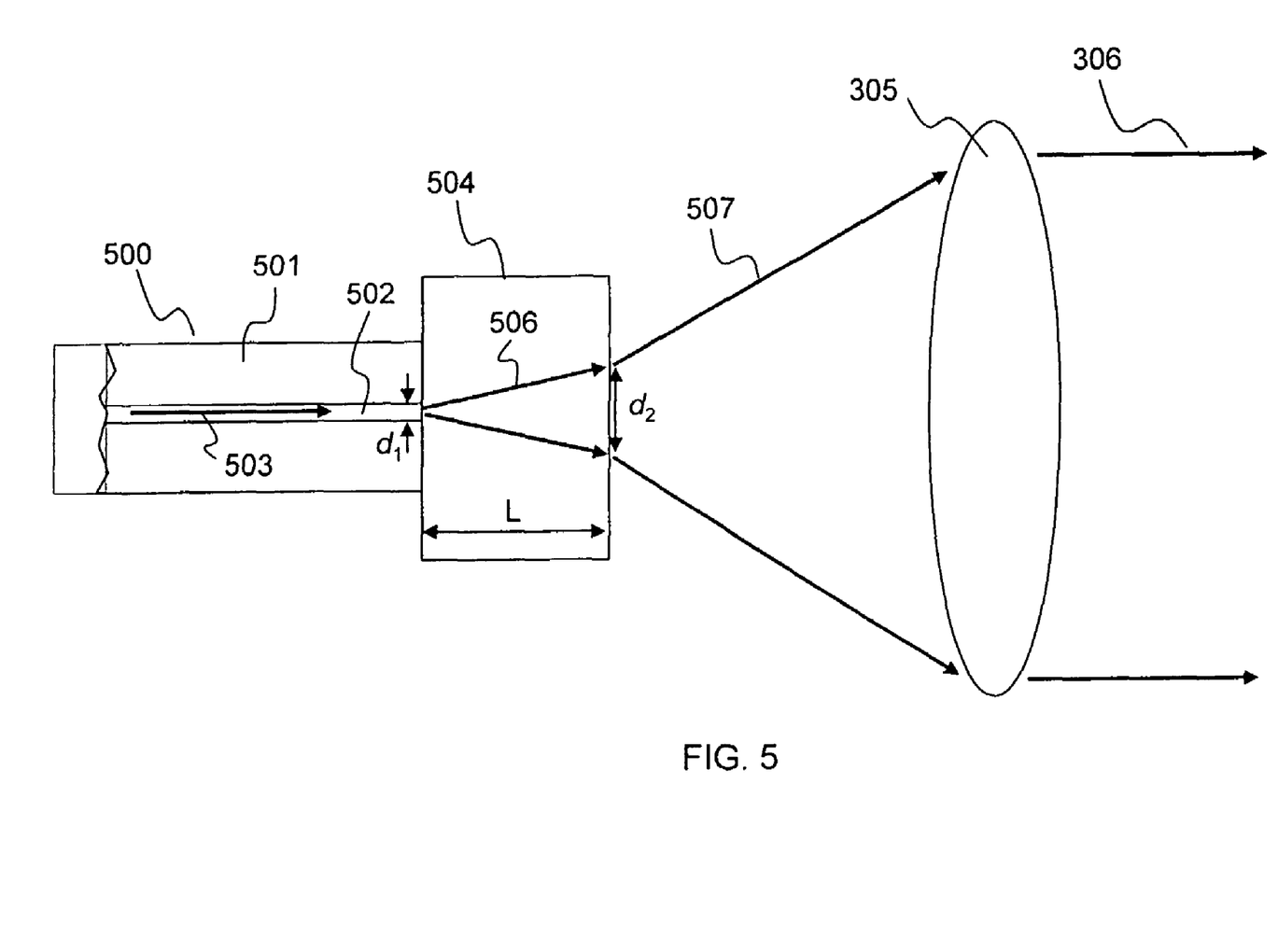
FIG. 5 is a block diagram of the end of the fiber of FIG. 3 with an optional bulk transparent material optical element to reduce the optical density at an air interface.

Since the APL is capable of generating high-power pulses, one issue with the use of a fiber spool of FIG. 3 as the storage medium 113 is the ability to couple light out of such fiber without incurring optical damage at the fiber interface where the optical energy emerges into air. Referring to FIG. 5, the end of the optical fiber of FIG. 3 providing the storage medium 113 is denoted as reference numeral 500. A transparent bulk optical element 504 is attached, such as fused or bonded, to the output end face of the optical fiber 500 in order to reduce the chance of optical damage. The optical pulse 503 emerging from the storage medium 113 is concentrated within the core 502 of the fiber due to the index of refraction difference between the core and the fiber cladding 501. In the absence of an attached transparent bulk optic 504, the optical pulse 503 has a cross-section of diameter $d_1$ which by way of example for a multi-mode fiber may be approximately 50 μm and for a single-mode fiber may be approximately 10 μm, which due to the small size of $d_1$ can result in high optical power densities. By attaching a transparent bulk optic element 504, the optical pulse first become an expanding beam 506 due to diffraction before it emerges from bulk optic 504. The transparent bulk optic 504 preferably has an index of refraction that nearly matches that of the optical fiber 500 to minimize back reflections and the attachment is preferentially done with low-defect materials, such that optical damage does not occur between said bulk optic and the optical fiber 500. By way of example, the optical fiber 500 may be a fused silica-based optical fiber, the bulk optic 504 a fused silica window of thickness L, and the attachment of bulk optic 504 to optical fiber 500 performed through the use of a laser fusion process. The thickness of the bulk optic L is chosen according to how much the optical power density of the optical fiber end face must be reduced in order to minimize the risk of optical damage. With the transparent bulk optic 504, the optical power density will be reduced by $$\left(\frac{d_2}{d_1}\right)^2 \approx \left[1 + 2\frac{L}{d_1}\tan\left[\sin^{-1}\left(\frac{NA}{n}\right)\right]\right]^2, \quad (1)$$

where $d_1$ is the width of the output beam 503 in the optical fiber, NA is the numerical aperture of said fiber and n is the index of refraction of the transparent bulk optic. For example, taking NA=0.13, n=1.46 (fused silica), L=5 mm, and $d_1$=0.010 mm, using Eq. (1), the optical power density is reduced by a factor of 32,000.

As depicted in FIG. 5, the expanding beam 507 emerging from the transparent bulk optic 504 encounters beam shaping optics 305 that substantially collimates the optical output beam 306. In general, the beam shaping optics 305 are optional, but when present they may, by way of example, may be used to alternately focus or diverge the beam 507.

Optionally, to suppress ASE in the APL 100, optics 305 or 307 may also represent an optical isolator in the path of the output pulse from the storage medium. The optical isolator is substantially transparent for light passing in one direction, but substantially opaque to light traveling in the reverse direction (commonly a factor of 1000 to 10,000 difference). An optical isolator will prevent backward traveling light (which would only be ASE) from parasitically depleting the gain of the storage medium. Also, to prevent ASE propagation optical filters may be provided in the path of the trigger pulses to the storage medium or at the input to storage medium, such optical filters transmit the wavelength(s) of the trigger pulses selected to be outputted by the trigger module, but substantially attenuate wavelengths which depart from the trigger pulses. Use of such optical isolator or optical filters can prevent the buildup of ASE in both the forward and the backward direction, allowing a greater amount of energy to be stored in the optical storage medium.

For certain applications, polarization control of the APL's output pulses (or beam) 109 (FIG. 1) or 306 (FIG. 3) may be provided by either using trigger pulses of defined polarization, and/or using polarization control element(s) to change (or maintain) polarization of output pulses from storage medium 113. In this manner for example, polarization may be controlled with regards to TE or TM, or circular or linear, polarization. Polarized trigger pulses may be achieved by using in trigger 110 that emits optical trigger pulses of a defined polarization by using polarized optical sources. For example, a trigger 110 that incorporate trigger sources that are lasers or LEDs as these optical sources may be obtained as polarized optical sources. Since the storage medium 113 releases its energy via stimulated emission due to the trigger optical pulse received, the radiation emitted by each atom in the storage medium dropping from a higher state to a lower state will have the same polarization as that of the incoming trigger optical pulse. However, any reflections the trigger pulse encounters before inducing stimulated emission or after, may alter the polarization state of the final output optical pulse relative to the initial trigger optical pulse. This polarization altering or depolarization phenomena is especially true for optical fibers that can bend in arbitrary directions. For an APL using optical fibers for interconnection of modules and/or for use as the storage medium 113 itself, it is therefore preferential that the optical fibers within the APL 100 are polarization maintaining (PM) fibers. As will be described below, a polarization control element 607 may also be used to control polarization of output pulses 109.

Figure 6:
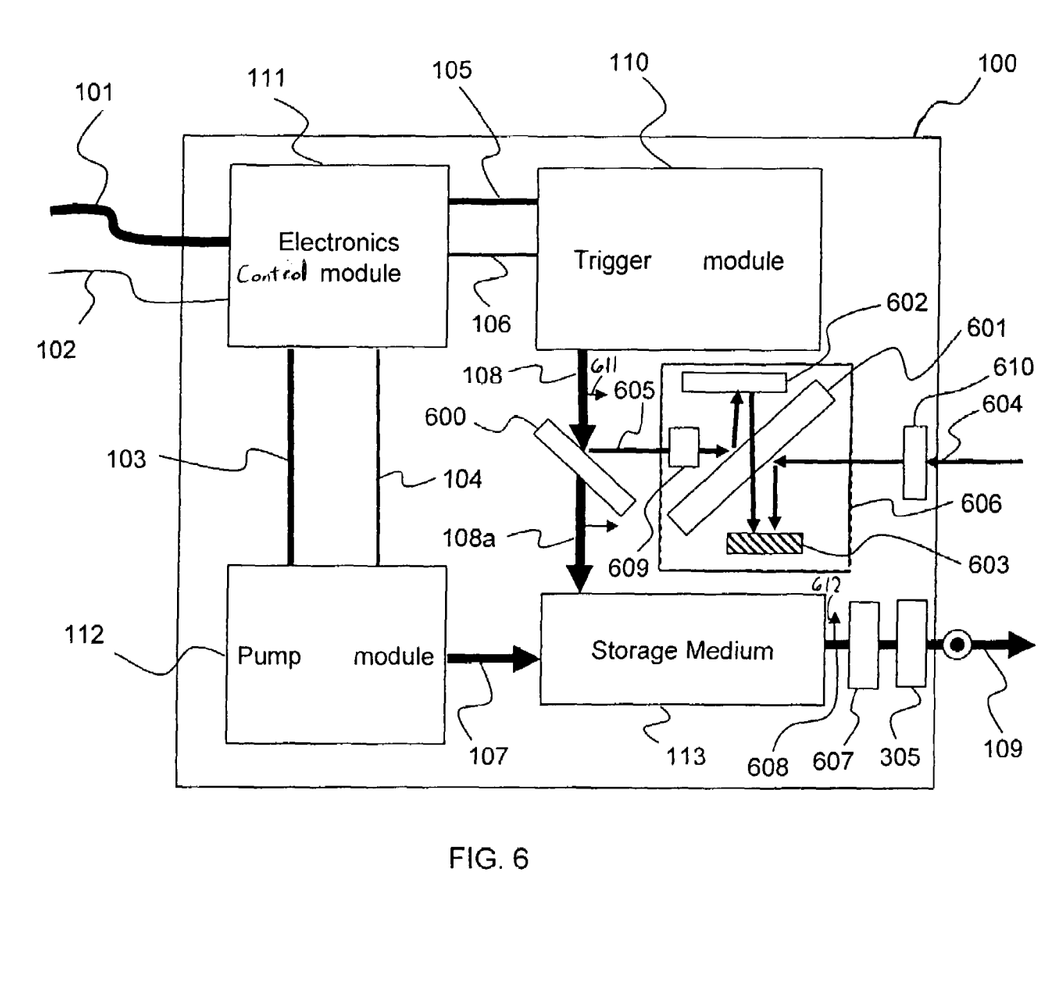
FIG. 6 is a block diagram of the APL similar to FIG. 1 having polarized output optical pulses and a module for enabling heterodyne or homodyne detection in remote sensing applications.

Referring to FIG. 6, the APL 100 having output pulses 109 of a certain polarization is shown further having a module for enabling heterodyne or homodyne detection for improved detection sensitivity. For example, various types of vegetation can be distinguished using polarimetric remote sensing, such as described in K. P. Papathanassious and S. R. Cloude, "Single Baseline Polarimetric SAR Interferometry," IEEE Transactions Geoscieve and Remote Sensing 39, 2352, (November 2001). Polarization control also allows heterodyne or homodyne detection in remote sensing for the purposes of increasing the SNR (Signal to Noise Ratio) of the sensor system due to the coherent construction and destruction of the reflected radiation with a control signal. The optical trigger pulse provided by optical connection 108 is shown in FIG. 6 emerging from the trigger 110 with an arrow 611 to indicate that it is polarized within the plane of the figure. A small fraction of optical trigger pulse is directed using beamsplitter 600 along optical connection (or path) 605 to an interferometric detection 606. Preferably, such the small fraction of the trigger pulse has greater optical power that the returned optical signal 604, in order to have a large increase in the SNR. The remainder of the trigger pulse enters into the storage medium 113 via path 108a and generates an optical output pulse 608 that is also polarized within the plane of the figure as denoted by arrow 612. Optionally, a polarization control element 607 is provided in order to alter the polarization of the output optical pulse 608, if needed. Such polarization control element 607 may be static, such as for example, a birefringent waveplate made of quartz, birefringent polymer, MgF2 or other substantially transmitting optical material, or may be dynamic, such as for example, a static waveplate mounted on an automated rotation stage, or an electro-optic crystal that can be dynamically addressed to change the polarization of optical pulse 608. In the case of a dynamic polarization control element 607, the control module 111 may have a power and signal lines (not shown) to element 607 to control the polarization state of the output pulse. The output pulse after having its polarization (TE or TM) altered by polarization control element 607 may optionally be beam shaped by beam shaping optics 305 to provide the desired output optical pulse 109.

In the example of FIG. 6, the polarization of output beam 109 was rotated 90 degrees from its original orientation of optical pulse 608 emitted from storage medium 113, such that it is polarized perpendicular to the plane of the figure. In general, however, the polarization may remain linear and rotated by a different angle, or may be converted into circular or elliptical polarization by polarization control element 607. If needed, additional polarization control element(s) may be provided in the path of the output pulse to provided the desired polarization of output optical pulse 109. The output pulse 109 emitted by the APL 100 for remote sensing applications, such as LIDAR, laser altimetry, and laser range finding directed at and reflect off of a distant object (not drawn). The returned optical signal is denoted by arrow 604, and is collected by optics 610 and coupled into the interferometric detection module 601. Within the detection module, the reflected optical beam is combined using mirror 602 and beamsplitter 601 with sampled trigger optical beam from connection or path 605. The resulting interfered beams is detected by optical detector 603, such as a CCD array or photodiode(s).

The interferometric detection 606 may alternatively be placed externally to the APL 100 while achieving the same function. The interferometric detection 606 illustrated is one possible method for combining two optical beams. Other means or methods as typically used in interferometry for combining two optical beams may also be used.

If a trigger optical pulse emerging from trigger 110 has a relatively short coherence length, delay optics 609 may be provided. Such delay optics 609 may be for example, a spool of optical fiber. The optical delay such delay optics 609 impart onto the sampled trigger optical beam along connection or path 605 is approximately matched to the round trip optical path length that the APL output pulse 109 receives before being detected in reflected optical signal 604 at the detection 606. Since the exact time of flight of a returned APL output pulse 109 cannot be predicted, it is advantageous that a low-level constant signal be emitted by the trigger 110 such that there is always a signal along the sampled trigger optical connection or path 605 that can be interfered with the returned optical signal 604. Thus, the small portion of trigger optical pulses passed to detection module 606 persists in time at least until after the return of the returned optical signal 604.

Figure 7:
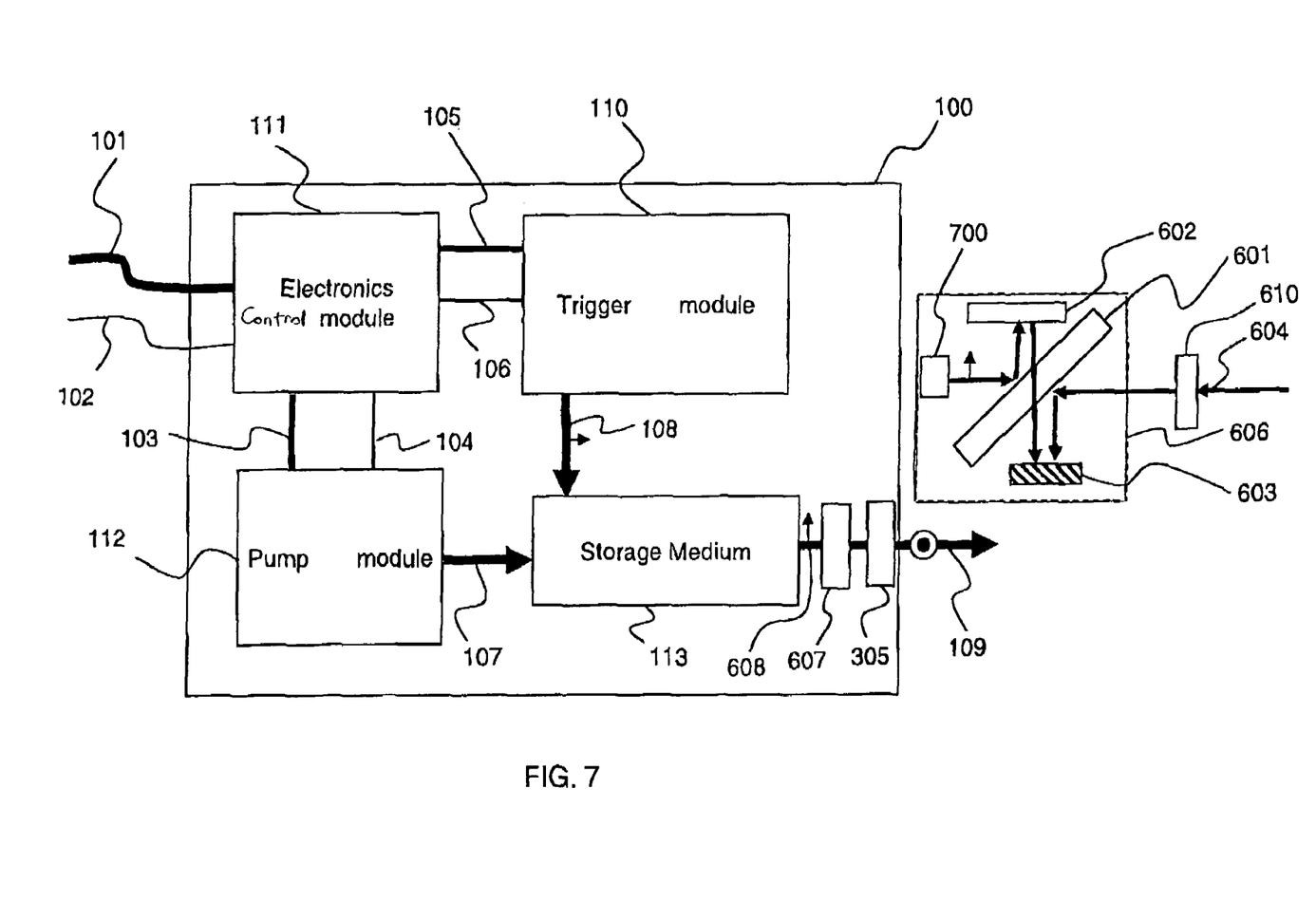
FIG. 7 is a block diagram of the APL similar to FIG. 6 in which the module for enabling heterodyne or homodyne detection is located outside the APL housing.

Alternatively for heterodyne detection, the beamsplitter 600 of FIG. 6 may be removed, and only a single output beam 109 having controlled polarization provided. Referring to FIG. 7, such an alternative heterodyne detection using APL 100 is illustrated. A second light source, termed the heterodyne source 700 is present in detection 606. This heterodyne source interferes with return signal 604 onto detector 603. As such, heterodyne source 700 must be locked in wavelength with respect to the APL output pulse 109 which puts the requirement upon trigger 110 that the wavelength emitted by the trigger connection 108 must be wavelength stabilized. Such wavelength stabilization is straightforward for certain lasers that may be used as trigger sources, for example HeNe laser, which do not have a strong temperature dependence upon wavelength. For other laser sources that are significantly more temperature dependent and fabrication dependent, such as semiconductor lasers, the use of Bragg gratings, Fabry Perot feedback control, and thermo-electric coolers (TECs) may be used to lock the wavelengths to accuracies less than 5 GHz in frequency. Preferentially, the heterodyne source 700 emits at substantially the same wavelength as that of the trigger module such that the temporal dependence of the interference on detector 603 is minimized. Both the heterodyne source 700 and the interferometric detection 606 may be provided within the APL 100.

The output pulse 109 parameters of APL 100 vary dependent upon different optical applications. For example, in the case of remote sensing using a laser range finder to track an object moving with respect to the finder, the pulse energy, pulse repetition rate, and pulse length required of the APL output pulse will depend upon the maximum range of use, the longitudinal distance accuracy of the laser range finder, and the relative speed of the laser range finder with respect to the object under observation. Generally, the pulse width should be equal to the time it takes light to travel the distance specified by the laser range finder's longitudinal accuracy. The APL pulse repetition rate is such that the object under observation does not move appreciably (i.e., less than the longitudinal distance accuracy specification for the laser range finder) during the time between pulses. Alternatively for laser range finders that can rapidly calculate trajectory of objects under observation, the trajectory of the object under observation cannot change appreciably (i.e., the extrapolated position of the object under observation must differ from the actual object location by less than the longitudinal distance accuracy specification for the laser range finder) during the time between pulses. The APL power per output pulse is such that the sufficient power returns to the detector of the laser range finder. This is a function of the signal-to-noise ratio (SNR)

required, the detector noise equivalent power (NEP), the maximum distance of laser range finder operation, the reflectivity and scatter profile of the object under observation, the collection aperture of the laser range finder's optics, and environmental conditions including fog, rain, and sandstorms.

One limitation on the ability of laser sources conventionally used in laser rangefinders to identify a target object at a large distance, and a limit on the ability to discriminate between multiple targets, is the optical power of the returned optical signal. Two ways to increase the optical power of the returned optical signal are (1) to transmit increase the power of the output beam 109, or (2) to collect more returned optical signal by increasing the size of the collecting optics. Therefore, as APL 100 more efficiently outputs energy from the stored medium 113, the application of an APL 100 with optical heterodyne or homodyne detection in a laser rangefinder may improve performance with a significant advantage in terms of cost, size and weight. For example, the APL 100 may by incorporated into laser range finding devices or systems, such as available from ALST of Orlando, Fla., USA or Nikon of Japan.

From the foregoing description, it will be apparent that there has been provided an improved apparatus and method for generating short optical pulses, and such apparatus and method provides a high power pulse laser source for various optical applications. Variations and modifications in the herein described apparatus and method in accordance with the invention will undoubtedly suggest themselves to those skilled in the art. Accordingly, the foregoing description should be taken as illustrative and not in a limiting sense.

The invention claimed is:

1. An apparatus for generating short optical pulses comprising:
   a storage medium capable of storing optical energy;
   a first module for pumping optical energy into the storage medium to energize the storage medium, wherein said first module pumps optical pulses or a continuous beam into the storage medium to energize the storage medium;
   a second module for delivering one or more trigger optical pulses to the optical storage medium in which each of the trigger optical pulses causes a cascade release of the energy stored in the storage medium in an output optical pulse having a greater power and narrower full width at half maximum size than the trigger optical pulse that caused the output pulse, wherein said one or more trigger optical pulses each have a rising edge which triggers the cascade release of one of said output optical pulse from the storage medium by substantially discharging the energy stored by a storage medium, said one or more trigger pulses are polarized, and said second module represents one or more sources for delivering said one or more trigger optical pulses;
   a third module controlling the operation of the first and second modules to effect characteristics of the output optical pulse;
   means for controlling said output optical pulse outputted from said storage medium;
   optics for receiving a return optical signal in response to said output pulse; and
   a module for detection of said output optical pulse in said return optical signal.

2. The apparatus according to claim 1 wherein said one or more trigger optical pulses are of one or more wavelengths, and the output optical pulse are of the same said one or more wavelengths as the trigger optical pulse that caused the output optical pulse.

3. The apparatus according to claim 1 wherein said output optical pulse has a reduced temporal duration due to strong saturation of the gain by the leading edge of the trigger optical pulse that caused said output optical pulse.

4. The apparatus according to claim 1 further comprising a housing having at least said storage medium, said first module, and said second module.

5. The apparatus according to claim 1 wherein the output optical pulse has a peak which is duration of less than one microsecond.

6. The apparatus according to claim 1 wherein the output optical pulse has a peak which is duration of less than ten nanoseconds.

7. The apparatus according to claim 1 wherein said storage medium is one of an optical fiber capable of optical energy storage.

8. The apparatus according to claim 1 wherein said storage medium is an optical fiber of glass material of one of silica glass, phosphate glass, fluoride glass, or chalcogenide glass, in which at least a portion of the said glass material has a concentration of one of or more of Erbium, Ytterbium, Neodymium, or Praseodymium.

9. The apparatus according to claim 8 in which said portion of the said glass material forms a continuous filament or channel between ends of the optical fiber.

10. The apparatus according to claim 1 wherein said storage medium is an optical fiber composed of a crystalline material.

11. The apparatus according to claim 10 wherein said crystalline material is of photonic crystal composition.

12. The apparatus according to claim 1 wherein said storage medium represents one of a gas mixture, glass, crystal, or semiconductor, or a liquid.

13. The apparatus according to claim 1 wherein said means controls the shape of said output optical pulse outputted from the storage medium.

14. The apparatus according to claim 1 wherein said storage medium is an optical fiber having an input face for receiving said pumping optical pulses and said one or more trigger optical pulses.

15. The apparatus according to claim 1 wherein said storage medium is an optical fiber having an output face for outputting said output optical pulse, and said apparatus further comprises an optical element attached to said exit face which prevents damage to the exit face of the optical fiber.

16. The apparatus according to claim 15 wherein said optical element is a transparent block having an index of refraction that substantially matches the index of refraction of the optical fiber.

17. The apparatus according to claim 1 wherein said means controls the polarization of said output optical pulse.

18. The apparatus according to claim 1 wherein said portion of said trigger optical pulses persists in time at least until after the return of the returned optical signal.

19. The apparatus according to claim 1 wherein said second module comprises one or more sources for producing said one or more trigger optical pulses having one or more wavelengths, in which said one or more sources are tunable, and said output optical pulse is of one or more wavelengths in response to said tuned one or more wavelengths of said one or more sources.

20. The apparatus according to claim 1 further comprising at least one optical element providing a dispersive medium for broadening the shape of said output optical pulse outputted from the storage medium.

21. The apparatus according to claim 20 wherein said one or more trigger optical pulses have a substantially continuous optical spectrum.

22. The apparatus according to claim 20 wherein said dispersive medium is one of a diffraction grating or a dispersive optical fiber.

23. The apparatus according to claim 1 wherein said apparatus is part of a system utilizing said output optical pulse for one of remote sensing, LIDAR, laser altimetry, or laser range finding.

24. An apparatus for generating short optical pulses comprising:
   a storage medium capable of storing optical energy;
   a first module for pumping optical energy into the storage medium to energize the storage medium;
   a second module for delivering one or more trigger optical pulses to the optical storage medium in which each of the trigger optical pulses causes a cascade release of the energy stored in the storage medium in an output optical pulse having a greater power and narrower full width at half maximum size than the trigger optical pulse that caused the output pulse, wherein said one or more trigger optical pulses each have a rising edge which triggers the cascade release of one of said output optical pulse from the storage medium by substantially discharging the energy stored by a storage medium, wherein said one or more trigger pulses are polarized, and said storage medium outputs a plurality of ones of said output optical pulse each in response to one of said trigger optical pulses;
   at least one optical element providing a dispersive medium for broadening the shape of said output optical pulse outputted from the storage medium; and
   said second module comprises one or more sources for producing said trigger optical pulse having one or more wavelengths, in which said one or more sources are tunable, and said optical pulse is of one or more wavelength in response to said tuned one or more wavelength of said one or more sources.

25. The apparatus according to claim 24 wherein said one or more trigger optical pulses each have a rising edge which triggers the cascade release of one of said output optical pulse from the storage medium by substantially discharging the energy stored by the storage medium.

26. The apparatus according to claim 24 further comprising a third module controlling the operation of the first and second modules to effect characteristics of the output optical pulse.

27. The apparatus according to claim 24 wherein said first module pumps optical pulses into the storage medium to energize the storage medium.

28. The apparatus according to claim 24 wherein said first module pumps a continuous beam into the storage medium to energize the storage medium.

29. The apparatus according to claim 24 wherein said second module represents one or more sources for delivering said one or more trigger optical pulses.

30. The apparatus according to claim 24 wherein said apparatus is part of a system for application of said output optical pulse to the body of a patient to enable a medical procedure.

31. The apparatus according to claim 24 further comprising means for enabling said output pulse to be emitted from said apparatus and collected by said apparatus for remote sensing in accordance with homodyne or heterodyne detection.

32. A method for generating short optical pulses using a storage medium capable of storing optical energy comprising the steps of:
   delivering pumping one of optical pulses or continuous beam into the storage medium to energize the storage medium;
   delivering one or more trigger optical pulses to the optical storage medium in which each of the trigger optical pulses causes a cascade release of the energy stored in the storage medium in an output optical pulse having a greater power and narrower full width at half maximum size than the trigger optical pulse that caused the output pulse, in which said one or more trigger optical pulses each have a rising edge which triggers the cascade release of one of said output optical pulse from the storage medium by substantially discharging the energy stored by a storage medium;
   controlling the operation of the first and second modules to effect characteristics of the output optical pulses
   controlling said output optical pulse outputted from said storage medium;
   receiving a return optical signal in response to said output pulse; and
   interferometically detecting said output pulse in said return optical signal utilizing said return optical signal and a portion of said trigger optical pulses, in which said portion of said trigger optical pulses persists in time at least until after the return of the returned optical signal.

33. The method according to claim 32 wherein said controlling step controls one of polarization or shape of said output optical pulse from the storage medium.

34. The method according to claim 32 further comprising the step of providing a housing having at least said storage medium and said first and second modules.

* * * * *